United States Patent [19]

Goetz

[11] Patent Number: 5,212,760
[45] Date of Patent: May 18, 1993

[54] DEVICE BY WHICH THE END OF AN OPTICAL CABLE INCORPORATED IN A POWER CABLE UNWINDABLE FROM A DRUM IS MAINTAINED FIXED RELATIVE TO AN OPTICAL READER

[75] Inventor: Francesco Goetz, Milan, Italy
[73] Assignee: Specimas S.P.A., Italy
[21] Appl. No.: 878,863
[22] Filed: May 5, 1992

[30] Foreign Application Priority Data

May 7, 1991 [IT] Italy ................. MI91A 001238

[51] Int. Cl.$^5$ .................... G02B 6/44; H01J 5/16; B65H 75/00
[52] U.S. Cl. .................... 385/134; 385/101; 385/136; 385/137; 385/147; 250/227.11; 250/227.28; 242/1; 242/54 R; 242/117; 242/118; 242/170
[58] Field of Search ............ 385/88, 100, 101, 134, 385/135, 136, 137, 147; 250/227.11, 227.14, 227.28, 571; 242/1, 117, 118, 170, 171, 172, 166, 167, 174, 176, 54 R

[56] References Cited

U.S. PATENT DOCUMENTS

| | | | |
|---|---|---|---|
| 3,989,578 | 11/1976 | Hashimoto | 385/136 X |
| 4,370,020 | 1/1983 | Davey | 385/135 X |
| 4,379,615 | 4/1983 | Toda et al. | 385/147 X |
| 4,883,337 | 11/1989 | Dahlgren | 385/147 X |
| 4,900,121 | 2/1990 | Becker et al. | 385/135 X |
| 4,955,688 | 9/1990 | Chapin et al. | 385/147 X |
| 4,957,344 | 9/1990 | Chesler et al. | 385/134 X |
| 4,961,623 | 10/1990 | Midkiff et al. | 385/135 X |
| 5,005,930 | 4/1991 | Schotter | 385/134 X |
| 5,058,969 | 10/1991 | Peterson et al. | 385/147 |
| 5,161,208 | 11/1992 | Christie et al. | 385/235 X |

Primary Examiner—Brian Healy
Attorney, Agent, or Firm—Steinberg & Raskin

[57] ABSTRACT

A device by which the end of an optical cable incorporated in a power cable is maintained fixed relative to an optical reader while the power cable is being wound onto or unwound from a cable winding drum. The device comprises a first roller on which there can be wound a number of turns of said optical cable equal at least to a fraction of the number of turns of power cable wound on said cable winding drum. The free end of said optical cable is locked in front of said optical reader after it has been wound through at least one turn or a portion of a turn on a roller on which there can be wound a number of turns equal at least to the number of turns which can be wound on said first roller. This latter is rotatably driven. At least said second roller is associated with a mobile structure rotating about and in mechanical synchronization with said roller.

10 Claims, 3 Drawing Sheets

DEVICE BY WHICH THE END OF AN OPTICAL CABLE INCORPORATED IN A POWER CABLE UNWINDABLE FROM A DRUM IS MAINTAINED FIXED RELATIVE TO AN OPTICAL READER

BACKGROUND OF THE INVENTION

This invention relates to a device by which the end of an optical cable incorporated in a power cable unwindable from a drum is maintained fixed relative to an optical reader.

It is usual to equip mobile cranes, for example of overhead travelling type, and/or other similar means with large power cables. These are usually wound on large-diameter cable winding drums fixed to the crane body. Such cable winding drums are driven in such a manner that when the crane moves the power cable is unwound or wound as required.

It is known to insert in these power cables, in addition to the electrical feed cables, an optical cable for transmitting control signals (in the present context an optical cable is meant a single optical fiber or a bundle of fibers).

When the cable winding drum rotates it is notoriously difficult to read the signals present at the end of the optical cable which axially emerges from said cable winding drum and is hence in a state of axial rotation.

In this respect, for obvious reasons a brush system as for electric cables cannot be used, but instead devices designed ad hoc and known to the expert of the art have to be employed. However such devices all have considerable drawbacks, they being all of very complicated construction and/or of very high cost.

For example, one reader device for this use comprises a seat having a plurality of circularly arranged mirrors, the end of the axially rotating optical cable being inserted into this seat. In this manner while the cable rotates, the signals leaving the optical cable are reflected towards a final reader unit and can hence be read. It is apparent that devices of this type must be of very high precision and are therefore of very high constructional cost. Further drawbacks of such devices are signal power loss and distortion caused by the multiple reflection of the light ray before it reaches the final reader unit.

SUMMARY OF THE INVENTION

An object of the present invention is to provide a winding device for an optical cable which in entering the device rotates axially whereas in leaving the device is fixed so that the cable end can cooperate with a usual optical reader.

A further object is to provide a simple low-cost device which can be easily connected to usual cable winding drums.

These and further objects which will be apparent to the expert of the art are attained by a device by which the end of an optical cable incorporated in a power cable is maintained fixed relative to an optical reader while the cable is being wound onto or unwound from a cable winding drum, characterized by comprising a first roller on which there can be wound a number of turns of said optical cable equal at least to a fraction of the number of turns of said power cable wound on said cable winding drum, the free end of said optical cable being locked in front of said optical reader after it has been wound through at least one turn or a portion of a turn on a second roller on which there can be wound a number of turns equal at least to the number of turns which can be wound on said first roller, said first roller being rotatably driven and said second roller being associated with a mobile structure rotating with and about said first roller.

BRIEF DESCRIPTION OF THE DRAWINGS

The present invention will be more apparent from the accompanying drawing, which is provided by way of non-limiting example and in which.

DETAILED DESCRIPTION OF THE INVENTION

Figure 1:
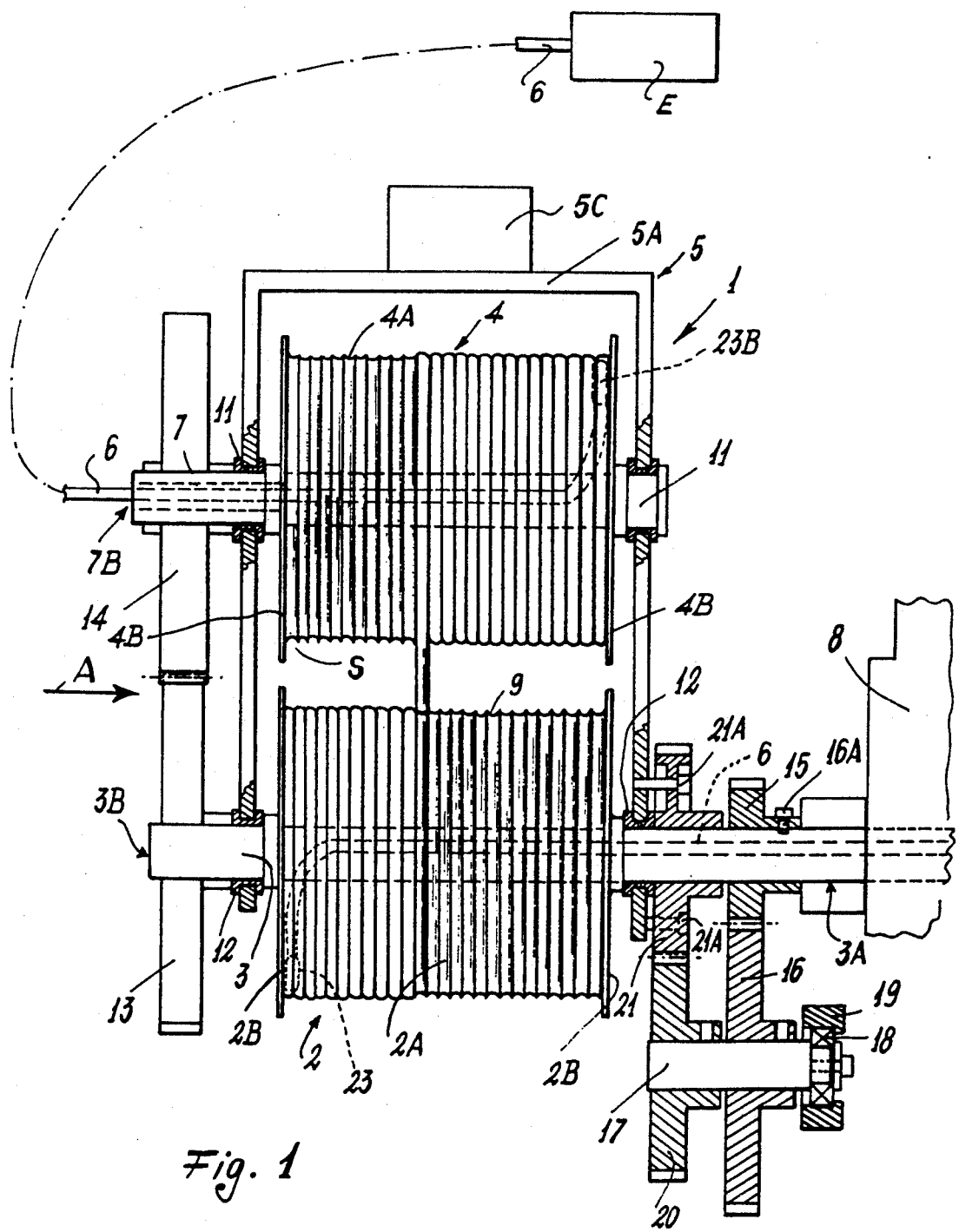
FIG. 1 is a partly sectional schematic view of the device according to the invention.

With reference to the figures, these show a device according to the invention, indicated overall by 1, comprising substantially a first roller 2 supported by and rigid with a shaft 3, and a second roller 4 supported by and rigid with a shaft 7, the two rollers being carried by a U-shaped frame 5.

The shaft 3, which is hollow, is joined in known manner, for example by welding or by other usual connection members, to the cable winding drum 30 (FIG. 3) on which a power cable 31 (FIG. 3) is wound, or to other usual devices 8 (described hereinafter) connected to said cable winding drum, so that said shaft 3 rotates at the same speed as the cable winding drum.

The roller 2 comprises a cylindrical surface 2A having a circumferential helical groove 9 for receiving the turns of an optical cable 6 wound on said surface, said optical cable emerging from a power cable 31. A layer of rubber or other elastic material (not shown in the figures) can be applied to the base of said groove 9 to facilitate the winding of the optical cable 6 on said roller 2. This latter also comprises two circular end flanges 2B of diameter just greater than the cylindrical surface 2A and having two central apertures for passage of the shaft 3. This latter is joined to said flanges 2B by usual joining means, for example by welding. The shaft 3 is supported by the frame 5 via bearings 12.

The roller 4 is identical to the roller 2 and comprises a helical groove 4A identical to that of the roller 2 and end flanges 4B having central apertures through which the hollow shaft 7 passes. This latter is mounted on bearings 11 housed in suitable seats provided in the frame 5.

In this manner the roller 4 is axially parallel to but spaced apart from the roller 2 and is free to rotate.

A counterweight 5C is provided on the minor side 5A of the frame 5 to balance the system.

Gear wheels 13 and 14 are fixed on one end 3B, 7B of the shafts 3 and 7 respectively, and cooperate with each other such that each revolution of the roller 2 produces a corresponding synchronous revolution of the roller 4.

In proximity to a part 3A the shaft 3 also comprises a further gear wheel 15, which is fixed to it by a screw 16A cooperating with a hole provided in this shaft.

The gear wheel 15 cooperates with a gear wheel 16 of diameter double that of the gear wheel 15 and fixed onto a hub 17 secured to a bearing 18 housed in a stationary support element 19.

A further gear wheel 20 is also fixed to the hub 17, to cooperate with an equal-diameter gear wheel 21 idly mounted on the shaft 3 and fixed by fixing members, such as screws 21A, to the moving frame 5.

Said frame 5 is hence driven via the gear train 15, 16, 20, 21 at a speed which in the illustrated example is one half the speed of the shaft 3.

As stated, the optical cable 6 is wound partly on the roller 2 and partly on the roller 4. More specifically, as the rollers are superposed and have identical dimensions and identical circumferential grooves 9 and 4A, the cable 6 is wound in such a manner that if the last groove turn occupied on the first roller is the $i^{th}$ turn (ie the turns from 1 to i are all occupied), the first groove turn occupied on the second roller is the i+1th turn (ie the turns from 1 to i are all unoccupied, whereas the turns from the i+1th to the end of the roller are all occupied).

The optical cable 6 passes through the interior of the shaft 3 (through the part 3A) to pass through a hole 23 (shown dashed in the figure) in both the shaft and the roller, to enter the first groove turn of the roller 2. Via an analogous hole 23B in the roller 4 and relative shaft, the cable passes from the last groove turn of the roller 4 to the interior of the shaft 7, from one end of which it finally emerges. It should be noted that the two holes 23, 23B in the two rollers 2 and 4 are provided in correspondence with mutually opposing sides 2B and 4B of the rollers. Hence the cable winds on the roller 2 from the opposite side to that from which it winds on the other roller 4.

When the cable has left the shaft it extends for a certain length to connect its end to a stationary optical reader. This cable length is such that the roller 4 can orbit about the roller 2.

Figure 3:
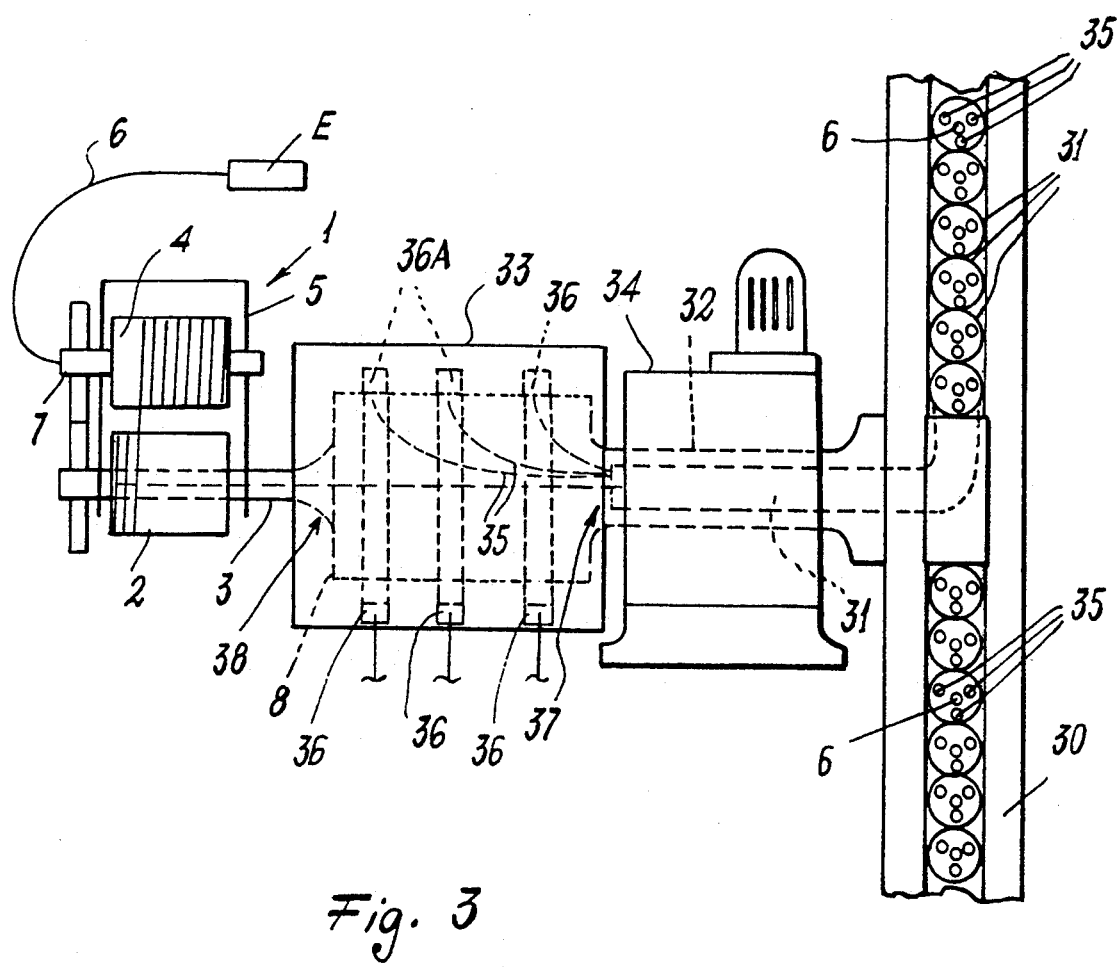
FIG. 3 schematically shows the device when associated with a cable winding drum.

FIG. 3 shows schematically a cable winding drum 30 holding a certain number of turns of a heavy power cable 31 comprising in its interior the optical cable 6 and a plurality of electrical feed conductors 35. One end of said power cable 31 emerges axially from the cable winding drum via a central passage, to extend into a hollow drive shaft 32 which in known manner derives its movement from a drive unit 34. Said end of the power cable is fixed against axial movement, whereas it rotates rigidly with the cable winding drum when this rotates to wind or unwind the power cable 31.

The shaft 32 has one end fixed (for example by bolting) to the body of the cable winding drum 30 and its other end fixed (for example by bolting) to the rotating body 8 of a usual ring-type electrical collector indicated overall by 33. The shaft 32 is driven in known manner (not shown in FIG. 3) by a usual drive unit indicated overall by 34 for driving the cable winding drum 30 and the collector 33.

The electrical conductors 35 (for example three in number) extend from the power cable 31 at the entry 37 to the electrical collector 33, to be each connected in the manner known to the expert of the art to a ring 36 mounted on the body 8 and on which there acts a brush 36A for feeding three-phase electricitiy, the optical cable 6 traversing said collector axially and emerging from an aperture 38 in said collector.

As stated, the hollow shaft 3 of the device of the invention, through the interior of which the optical cable 6 emerging from the aperture 38 passes, is connected axially to the rotating body 8 of the collector 38. The speed of rotation of the cable winding drum 30, the shaft 32, the rotating body 8 of the collector 33, and the shaft 3 connected to the roller 2 is therefore the same in each case.

The operation of the device according to the invention is as follows (FIGS. 2A-E).

The optical cable 6 is wound on the two rollers 2 and 4 in such a manner that the total number of turns of optical cable 6 wound on the two rollers 2 and 4 is at least one half the number of turns of power cable 31 wound on the cable winding drum 30.

Figure 2A:
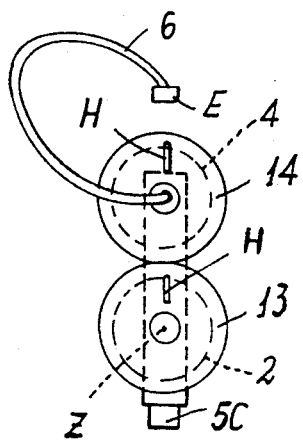
FIGS. 2A, 2B, 2C, 2D, 2E are schematic side views of the device taken in the direction of the arrow A of FIG. 1 during different stages of operation.
Figure 2B:
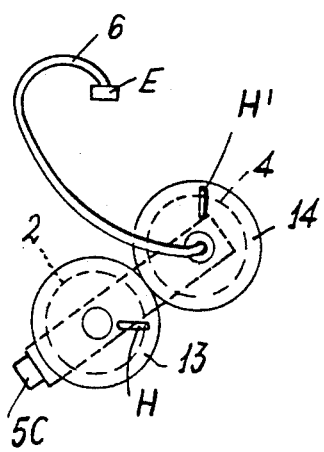
Figure 2C:
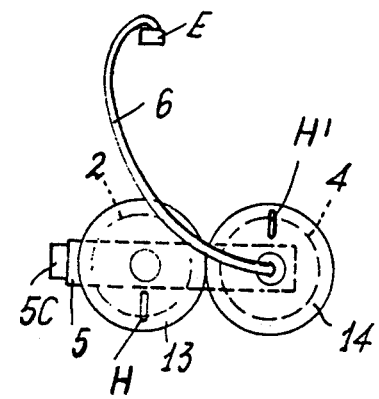
Figure 2D:
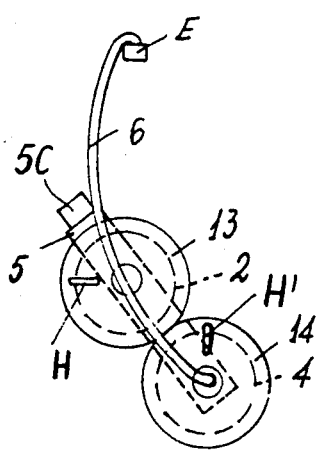
Figure 2E:
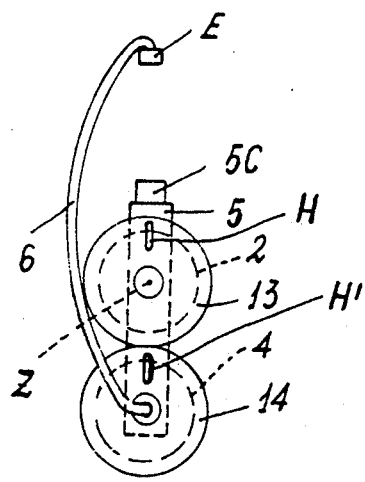

With reference to FIGS. 2A, B, C, D, E, which schematically illustrate the positions of the rollers 2, 4 and frame 5 after one quarter, one half, two thirds and one complete revolution of the roller 2, and taking as reference the axis Z of the roller 2 it can be seen that for each complete revolution of the roller 2 (and also of the cable winding drum 30), the frame 5, driven by the gear train 15, 16, 20, 21 (see FIG. 1) travels through one half of a revolution, whereas the roller 4 does not rotate about its axis (to facilitate understanding of FIGS. 2A, B, C, D, E, the gear wheels 13 and 14 comprise a reference notch H and H' respectively). By virtue of these movements, the cable is therefore unwound (or wound, according to the direction of rotation) from the roller 2 and wound (or unwound) onto the roller 4 by one half of a turn, it hence being clear that the maximum number of turns which wind onto each of the two rollers is one half the number of turns wound on the cable winding drum 30.

It must be emphasized that during this winding/unwinding of the cable from one roller to the other the cable is never under tension or pulled. This is advantageously achieved by forming the various connections between rollers and shafts and between rollers and gear wheels by interposing usual damper means such as springs.

It should be noted that at the initial moment, when the power cable is for example completely wound onto its cable winding drum (n turns), the optical cable 6 has been wound through all the available groove turns (n/z) of the roller 2, but only through a short length of the last groove turn (indicated by the arrow S in FIG. 1) of the roller 4.

As stated, with respect to the axis Z of the roller 2, the roller 4 does not rotate about its own axis and hence the optical cable 6 leaving the hub 7 of the roller 4 is at rest.

More precisely, an external observer viewing the device in the direction of the arrow A of FIG. 1 when the roller 2 is rotating and the roller 4 is orbiting about it, would see the optical cable portion leaving the hub 7 and connected to the optical reader E moving but without ever rotating axially about its own axis.

The device therefore basically receives an axially rotating inlet cable extending from a power cable and presents an outlet optical cable which on longer rotates about its own axis, so that a usual optical fiber reader can be used rather than a special reader for optical fibers rotating about their axis.

It should be noted that the illustrated embodiment is provided by way of example and that the various components of the device can be dimensioned differently if the necessary modifications are made. For example the two rollers 2 and 4 can be of different diameters. If for example the roller 1 has a smaller diameter than the roller 4 and both rollers continue to rotate synchronously with each other, the frame must be driven at a lower speed than that stated for the preceding embodiment and proportional to the diameter difference, with the result that the dimensions of the gear wheels 15, 16, 20, 21 must also be modified.

It is also apparent that the means used for transmitting the motion of the shaft 3 to the roller 4 and frame 5 (i.e. the combination of gear wheels 13, 14, 15, 16, 20, 21) can be replaced by other means of analogous function such as belts and chains.

In a further embodiment (not illustrated) of the device according to the invention, the two rollers on which the optical cable winds are coaxially adjacent and are of equal dimensions. Only one of the two rollers can rotate concordantly with the winding, whereas the other remains fixed.

Both the rollers are supported by the same shaft, to which a substantially U-shaped frame is hinged, free to rotate about both rollers, its major side, parallel to said shaft, comprising a plurality of usual guide members spaced apart such that if the $i^{th}$ turn unwinds from the first roller, the cable is wound onto the other roller in the $i+1^{th}$ groove turn. The movement of the frame relative to the roller is identical to that previously described. All the observations made in respect of the preceding embodiment remain valid.

What I claim is:

1. A device by which the end of an optical cable incorporated in a power cable is maintained fixed relative to an optical reader while the power cable is being wound onto or unwound from a cable winding drum, characterized by comprising a first roller (2) on which there can be wound a number of turns of said optical cable (6) equal at least to a fraction of the number of turns of said power cable wound on said cable winding drum, the free end of said optical cable being locked in front of said optical reader (E) after it has been wound through at least one turn or a portion of a turn on a second roller (4) on which there can be wound a number of turns equal at least to the number of turns which can be wound on said first roller (2), said first roller (2) being rotatably driven and said second roller (4) being associated with a mobile structure (5) rotating about said first roller (2).

2. A device as claimed in claim 1, characterized in that means are provided for determining an equal length relationship between the optical cable unwound from and the optical cable wound onto said rollers (2, 4).

3. A device as claimed in claim 2, characterized in that said means are a plurality of gear wheels (13, 14, 15, 16, 20, 21) mechanically connecting said rollers (2, 4) and said mobile structure (5) together.

4. A device as claimed in claim 1, characterized in that said first roller (2) is rotated by said cable winding drum, and said second roller (4) is fixed rotationally about its own axis.

5. A device as claimed in claim 1, characterized in that said second roller (4) is idly mounted on said mobile structure (5).

6. A device as claimed in claim 1, characterized in that said first roller (2) comprises an axial inlet and a peripheral outlet for said optical cable (6), said second roller (4) comprising a peripheral inlet and an axial outlet for said optical cable (6) wound on it.

7. A device as claimed in claim 1, characterized in that said first and second roller (2, 4) are in coaxial relationship, said mobile structure (5) comprising guide means for said optical cable.

8. A device as claimed in claim 2, characterized in that said means are a plurality of gear wheels mechanically connecting said first roller (2) and said mobile structure (5) together.

9. A device as claimed in claim 2, characterized in that said means are a plurality of flexible transmission elements such as belts, chains or similar elements.

10. An arrangement comprising a drum, a power cable wound on said drum, said power cable including at least one optical fiber means and electrical conductors, driving means for rotating said drum, a hollow shaft connected to said drum and passing through said driving means, said power cable extending through said shaft, a rotary collector means connected to said shaft for connecting said electrical conductors to a power source, a first winding roller drivingly connected to said rotary collector means optical fiber means extending through said rotary collector means and entering into said first roller to be wound thereon, a first power transmission means drivingly connected to said first roller, a second winding roller for winding said optical fiber in exchange relationship with said first winding roller, a support means for rotatably supporting said second winding roller, said support means being rotatably supported in coaxial relationship to said first winding roller, a reduction gearing unit for rotating said support means, said reduction gearing being drivingly connected to said rotary collector means, said power transmission means being drivingly connected to said second winding roller to transmit its rotary motion thereto, a stationary optical reader means, and outlet means in said second winding roller for guiding said optical fiber means to said stationary optical reader means.

* * * * *